United States Patent Office 3,522,258
Patented July 28, 1970

3,522,258
PIPERAZINE DI-(N-ACETYL-GLYCINATE)
Maria Luisa Ricciardi and Aurora Sanfilippo, Milan, Italy, assignors to Società Farmaceutici Italia, Milan, Italy, an Italian corporation
No Drawing. Filed May 15, 1967, Ser. No. 638,601
Claims priority, application Italy, May 20, 1966, 11,603/66
Int. Cl. C07d 51/64
U.S. Cl. 260—268
1 Claim

ABSTRACT OF THE DISCLOSURE

Anthelmintic having low toxicity is disclosed. Piperazine di-(N-acetyl-glycinate) can be used in veterinary therapy. The compound is prepared by salifying piperazine hexahydrate with N-acetylglycine.

SPECIFICATION

Our invention relates to a new compound having anthelmintic activity and to a process for the preparation thereof. More particularly, the present invention has as an object a new piperazine derivative, piperazine di-(N-acetyl-glycinate) having a high anthelmintic activity and a low toxicity, which is usefully employed in veterinary therapy, and the preparation thereof.

Piperazine and some of the derivatives thereof have an anthelmintic activity; however, they show remarkable disadvantages which make it difficult to employ them in therapy. Some of them, for example, have an undesirable taste, are easily hygroscopic or are unstable. Thus their preservation and preparation of pharmaceutical forms require particular care. We have found a new piperazine compound which presents neither any of the above-cited disadvantages nor other undesired side effects and shows an anthelmintic activity higher than that of the compounds known and used in this field.

We have thus found a new and improved agent able to fight the helmintic infections in veterinary field. Piperazine di-(N-acetylglycinate), the new product of the invention, is prepared by salifying piperazine hexadydrate with N-acetylglycine in the presence of suitable organic solvent. The crude product obtained can be separated in almost quantitative yields. Piperazine di-(N-acetylglycinate) is a white, crystalline, non-hygroscopic solid, melting at 225° C.

The following example serves to illustrate the present invention without limiting it.

EXAMPLE

Piperazine di-(N-acetylglycinate)

46.8 g. of N-acetylglycine are added to a solution of 38.8 g. of piperazine hexahydrate in 200 cc. of warm ethanol. The solvent is evaporated in vacuo and the residue is taken up with a small amount of acetone and dried. A white non-hygroscopic solid, melting at 225° C., is obtained in a nearly quantitative yield.

The anthelmintic activity of this product has been determined by tests in vivo carried out on mice infected by *Syphacia obvelata* and compared with tests using piperazine hexahydrate. Treatments had been carried out for 1, 3 and 5 days, administering the compound by the oral route at doses equivalent in piperazine base. In Tables 1 and 2, respectively, are shown the results obtained with different treatment times and doses. The doses of the products under examination expressed in mg./kg./day, are in terms of the piperazine base.

TABLE 1

| Compound | Dose, mg./kg./day | Duration of the treatment, days | Improvement, percent |
|---|---|---|---|
| Piperazine hexahydrate | 100 | 5 | 66.6 |
|  | 100 | 3 | 70.0 |
|  | 100 | 1 | 20.0 |
| Piperazine di-(N-acetylglycinate) | 162 | 5 | 70.0 |
|  | 162 | 3 | 70.0 |
|  | 162 | 1 | 30.0 |

TABLE 2

| Compound | Dose, mg./kg./day | Duration of the treatment, days | Improvement, percent |
|---|---|---|---|
| Piperazine hexahydrate | 100 | 5 | 73.33 |
|  | 50 | 5 | 0 |
|  | 25 | 5 | 0 |
| Piperazine di-(N-acetylglycinate) | 162 | 5 | 73.33 |
|  | 81 | 5 | 53.30 |
|  | 40.5 | 5 | 0 |

The above results show that the highest activity, which was obtained with a treatment of 5 days, occurs even when the period of treatment is reduced with the new compound of the invention (Table 1) and a better than 50% improvement of the treated animals was obtained even with a daily dose half of the optimum, as contrasted to a dose, equal in piperazine base, of piperazine hexahydrate which is quite inactive (Table 2).

The activity of the product of the invention also has been compared to that of piperazine adipate and acetylglycine on mice spontaneously infected by *Syphacia obvelata*. The results obtained are in Table 3. Piperazine di-(N-acetylglycinate) and piperazine adipate have been administered orally at equivalent doses by weight. The acetylglycine has been administered at the highest dose tolerated (100 mg./kg.) and at the dose corresponding to the quantity of acetylglycine contained in 200 mg. of piperazine di-(N-acetylglycinate) (140 mg./kg.).

TABLE 3

| Compound | Dose, mg./kg./day | Duration of the treatment, days | Improvement, percent |
|---|---|---|---|
| Piperazine di-(N-acetylglycinate) | 200 | 5 | 80 |
| Piperazine adipate | 200 | 5 | 50 |
| N-acetylglycine | 1,000 | 3 | 0 |
|  | 140 | 3 | 0 |

The results obtained show a higher activity of piperazine di-(N-acetylglycinate) than that of adipate, and the administration of the acetylglycine, at high doses also, is quite inactive.

Comparison tests carried out with piperazine dithiocarbamate have shown that piperazine di-(N-acetylglycinate) has a larger activity spectrum. For example, piperazine di-(N-acetylglycinate) is active in vitro on *Syphacia obvelata* and Hymenolepisnana whereas piperazine dithiocarbamate is inactive. Table 4 gives the $LD_{50}$ values, expressed in g./kg., i.e. the dose able to kill 50% of the treated animals, by oral administration.

TABLE 4

| Compound: | $LD_{50}$ (g./kg.) (mouse) |
|---|---|
| Piperazine di-(N-acetylglycinate) | 12.500 |
| Piperazine adipate | 12.500 |
| N-acetylglycine | 6.000 |
| Adipic acid | 2.180 |

Clinically piperazine di-(N-acetylglycinate) is preferably administered by the oral route, for example in the form of tablets, pills, capsules or syrups, in the presence of a solid or liquid diluent or carrier. In the veterinary field, oral administration is preferred using the same pharmaceutical forms as in the clinic, or the product in the form of powder may be added to the feed. For this purpose the product may be added to one of the ingredients, which form the normal animal diet. Piperazine di-(N-acetylglycinate) is particularly useful for the elimination of worms in pigs, horses, cattle, sheep, chickens, dogs and cats.

We claim:
1. Piperazine di-(N-acetylglycinate).

References Cited

UNITED STATES PATENTS

| | | | |
|---|---|---|---|
| 2,708,195 | 5/1955 | Abramson | 260—268 |
| 2,753,350 | 7/1956 | Hasselstrom | 260—268 |
| 2,842,548 | 7/1958 | Callahan | 260—268 |
| 3,019,226 | 1/1962 | Bernstein | 260—268 |
| 3,227,718 | 1/1966 | Johannis et al. | 260—268 |
| 3,347,862 | 10/1967 | Wang | 260—268 |
| 3,349,090 | 10/1967 | Broome et al. | 260—268 |

OTHER REFERENCES

Chem. Abstr., vol. 53, col. 1,171, abstracting British Pat. 798,680 to Rhone Poulenc, July 1958.

DONALD G. DAUS, Primary Examiner

U.S. Cl. X.R.

424—250; 260—518